(12) United States Patent
Dyer et al.

(10) Patent No.: US 11,022,452 B2
(45) Date of Patent: Jun. 1, 2021

(54) INCONVENIENCE FOR PASSENGER PICKUPS AND DROP OFFS FOR AUTONOMOUS VEHICLES

(71) Applicant: Waymo LLC, Mountain View, CA (US)

(72) Inventors: John Wesley Dyer, Mountain View, CA (US); Leonid Yeykelis, Mountain View, CA (US); Michael Epstein, Danville, CA (US); Salil Pandit, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 452 days.

(21) Appl. No.: 15/985,144

(22) Filed: May 21, 2018

(65) Prior Publication Data

US 2019/0353495 A1 Nov. 21, 2019

(51) Int. Cl.
| | |
|---|---|
| *G01C 21/34* | (2006.01) |
| *G06K 9/00* | (2006.01) |
| *G06T 7/20* | (2017.01) |
| *G06T 7/70* | (2017.01) |
| *G06F 16/29* | (2019.01) |

(52) U.S. Cl.
CPC ......... *G01C 21/3484* (2013.01); *G06F 16/29* (2019.01); *G06K 9/00369* (2013.01); *G06K 9/00798* (2013.01); *G06T 7/20* (2013.01); *G06T 7/70* (2017.01)

(58) Field of Classification Search
CPC ............ G01C 21/3484; G01C 21/3438; G01C 21/32; G06F 16/29; G06K 9/00798; G06K 9/00369; G06K 9/00791; G06T 7/20; G06T 7/70; G09B 29/007; G06Q 30/0278; G06Q 10/02; G06Q 50/30; G06Q 10/0639
See application file for complete search history.

(56) References Cited

U.S. PATENT DOCUMENTS

| | | | |
|---|---|---|---|
| 9,613,386 B1 | 4/2017 | Arden et al. | |
| 10,508,925 B2 * | 12/2019 | Badalamenti | G01C 21/3647 |
| 10,613,537 B2 * | 4/2020 | Matthiesen | G01C 21/32 |

(Continued)

FOREIGN PATENT DOCUMENTS

WO  2017205822 A1  11/2017

OTHER PUBLICATIONS

International Search Report and Written Opinion for application No. PCT/US2019/031505 dated Aug. 28, 2019.

*Primary Examiner* — Rami Khatib
(74) *Attorney, Agent, or Firm* — Botos Churchill IP Law

(57) ABSTRACT

Aspects of the disclosure relate to generating map data. For instance, data generated by a perception system of a vehicle may be received. This data corresponds to a plurality of observations including observed positions of a passenger of the vehicle as the passenger approached the vehicle at a first location. The data may be used to determine an observed distance traveled by a passenger to reach a vehicle. A road edge distance between an observed position of an observation of the plurality of observations and a nearest road edge to the observed position may be determined. An inconvenience value for the first location may be determined using the observed distance and the road edge distance. The map data is then generated using the inconvenience value.

21 Claims, 14 Drawing Sheets

(56) References Cited

U.S. PATENT DOCUMENTS

| | | |
|---|---|---|
| 10,656,645 B1 * | 5/2020 | Sturges ................ G05D 1/0088 |
| 10,685,416 B2 * | 6/2020 | Tolkin .................... G06Q 50/30 |
| 2008/0270204 A1 * | 10/2008 | Poykko .............. G06Q 30/0204 |
| | | 705/7.29 |
| 2016/0370194 A1 | 12/2016 | Colijn |
| 2017/0153714 A1 | 6/2017 | Gao et al. |
| 2017/0199523 A1 | 7/2017 | Barton-Sweeney et al. |
| 2017/0329346 A1 | 11/2017 | Latotzki |
| 2017/0343375 A1 * | 11/2017 | Kamhi ............... G01C 21/3407 |
| 2017/0370734 A1 | 12/2017 | Colijn et al. |
| 2018/0033112 A1 * | 2/2018 | Wu .......................... G08G 1/00 |
| 2018/0107222 A1 | 4/2018 | Fairfield et al. |
| 2019/0137291 A1 * | 5/2019 | Rong .................... G06Q 50/30 |

\* cited by examiner

400

INCONVENIENCE FOR PASSENGER PICKUPS AND DROP OFFS FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

When a person (or user) wants to be physically transported between two locations via a vehicle, they may use any number of taxi services. To date, these services typically involve a human driver who is given dispatch instructions to a location to pick up and drop off the user. Generally these locations are worked out via physical signals (i.e. flagging down the driver), a phone call where the user explains where he or she actually is, or an in person discussion between the driver and user. In the case of an autonomous vehicle, such coordination is often difficult or impossible to achieve and may lead to significant inconvenience to the passenger in terms of the distance to reach a vehicle or desired destination where the vehicle stops to pick up or drop off a passenger, respectively.

BRIEF SUMMARY

One aspect of the disclosure provides a method comprising retrieving data generated by a perception system of a vehicle corresponding to a plurality of observations including observed positions of a passenger of the vehicle as the passenger approached the vehicle at a first location; determining, using the data, an observed distance traveled by a passenger to reach the vehicle; determining a road edge distance between an observed position of an observation of the plurality of observations to a nearest road edge to the observed position; determining an inconvenience value for the first location using the observed distance and the road edge distance; and generating the map data using the inconvenience value.

The inconvenience value may be determined further based on a difference between the observed distance and the road edge distance. The observed position may be an earliest in time of all of the plurality of locations. The observed position may have a timestamp corresponding to a time that is a predetermined period of time before a time when the passenger reached the vehicle. The observed distance may correspond to a sum of the differences in distances between adjacent observed positions of the plurality of observations, and wherein adjacent corresponds to adjacent in time.

The method may further comprise incorporating the map data into a prior map. The method may further comprise determining the nearest road edge using the prior map. The method may further comprise providing the inconvenience value to a computing device of an autonomous vehicle in order to allow the autonomous vehicle to determine a pickup location.

The method may further comprise receiving, from a client computing device, a request to identify one or more possible pickup locations for a trip; and in response to the request to the client computing device, providing information identifying the first location using the inconvenience value. The method may further comprise providing, in response to the request to the client computing device, a notification identifying the convenience or inconvenience of the first location based on the inconvenience value.

When the data further includes a second plurality of observations including second observed positions of a passenger of the vehicle after the passenger exited the vehicle at a second location, the method may further comprise determining, using the data, a second observed distance traveled by a passenger to reach a destination; determining a second road edge distance between a second observed position of a second observation of the second plurality of observations corresponding to a nearest road edge to the second observed position; determining a second inconvenience value for the second location using the second observed distance and the second road edge distance; and generating the map data using the second inconvenience value.

The second inconvenience value may be determined further based on a difference between the second observed distance and the second road edge distance. The second observed position may be a latest in time of all of the plurality of locations. The second observed position may have a timestamp corresponding to a time that is a predetermined period of time after a time when the passenger left the vehicle. The second observed distance may correspond to a sum of the differences in distances between adjacent second observed positions of the plurality of observations, and wherein adjacent corresponds to adjacent in time.

The method may further comprise incorporating the map data into a prior map. The method may further comprise determining the second nearest road edge using the prior map. The method may further comprise providing the second inconvenience value to a computing device of an autonomous vehicle in order to allow the autonomous vehicle to determine a drop off location. The method may further comprise receiving, from a client computing device, a request to identify one or more possible drop off locations for a trip; and in response to the request to the client computing device, providing information identifying the second location using the second inconvenience value. The method may further comprise providing, in response to the request to the client computing device, a notification identifying the convenience or inconvenience of the second location based on the second inconvenience value.

DETAILED DESCRIPTION

Overview

Figure 1:
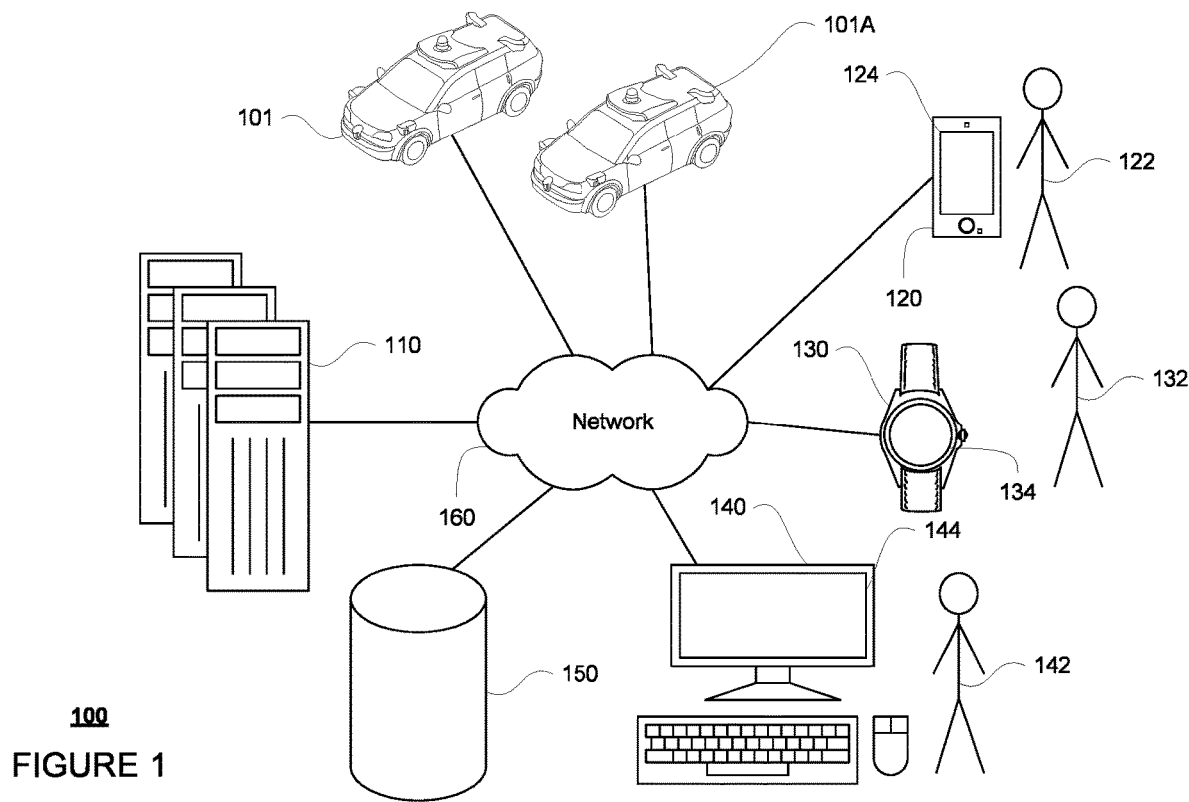
FIG. 1 is a pictorial diagram of a system in accordance with aspects of the disclosure.

The technology relates to assessing inconvenience of a pickup location and using that assessment to determine where to attempt future pickup locations for autonomous vehicles when providing transportation services to passenger. Pickup locations may refer to locations where the autonomous vehicle stops to wait to pick up a passenger for a trip. Drop off locations may refer to locations where the autonomous vehicle stops to allow for a passenger to exit the vehicle after a trip. These locations may actually be discrete, pre-determined pickup and drop off locations, and in some instances, hand-selected by a human operator or learned by a computing device over time. The inconvenience of a particular location may be assessed and then used to generate map data and/or a map of such information. This map may then be used by an autonomous vehicle in order to identify locations to pick up or drop off a passenger, thereby improving passenger experience, both with respect to inconvenience and safety, with the service.

As the vehicle drives around, the vehicle's perception system may detect, identify, and log various information and objects, including pedestrians. Each pedestrian may be provided with an identifier. When a pedestrian within a predetermined distance, "disappears" from the vehicle's perception system when the vehicle's door is open, the door closes, and the pedestrian is still not visible to the perception system, the vehicle's computing devices may log an event. In order to assess the inconvenience of the location where the vehicle stopped for the pickup, the log may be used to retrieve the movements of the passenger from the time when the passenger was first detected by the vehicle's perception system to when the passenger entered the vehicle. These movements may be used to determine an observed distance that the passenger traveled.

The inconvenience of a location where the vehicle stopped for the pickup may be determined as an inconvenience distance corresponding to an additional distance a passenger may have had to travel in order to reach the vehicle. For instance, the inconvenience distance may be a difference between an observed distance that the passenger traveled to reach the vehicle and an edge distance or distance to the road edge for the passenger. This inconvenience distance may be used to determine an inconvenience value. A similar process may be used to determine an inconvenience distance and value for a drop off location.

The inconvenience values the locations where vehicles stopped to pickup and drop off passengers may be used to generate map data and/or a map. This map data may be used in various ways such as assisting users or passengers in identifying pickup and/or drop off locations as well as assisting the computing devices of autonomous vehicles in identifying where to stop in order to pick up or drop off a passenger.

The features described herein may allow for automatic assessment of the inconvenience (or convenience) of a particular location for picking up or dropping off a passenger. This in turn, may be used to provide better and safer transportation services by limiting the distance would have to walk to reach a vehicle or a destination as well as possibly limiting inconvenience to other road users (such as cross traffic, other pedestrians, etc.) by avoiding long delays caused by the pedestrian walking to reach a vehicle. This can be especially important where the passenger is a minor or has a disability, such as someone who has trouble walking, has a walker, uses a wheelchair, or where the passenger is accompanied by persons with disabilities or minors.

Example Systems

Figure 2:
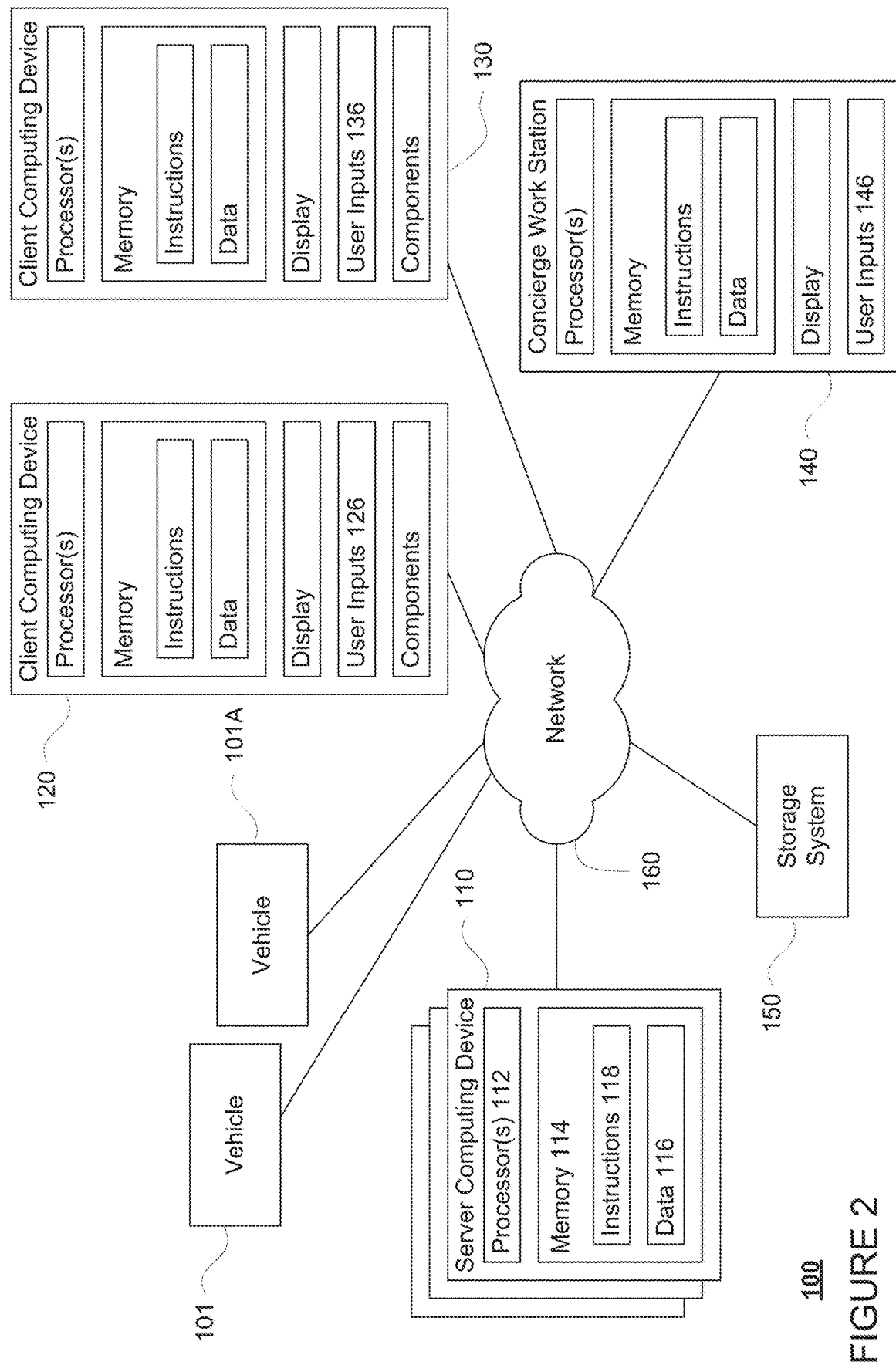
FIG. 2 is a functional diagram of the system of FIG. 1 in accordance with aspects of the disclosure.

FIGS. 1 and 2 are pictorial and functional diagrams, respectively, of an example system 100 that includes a plurality of computing devices 110, 120, 130, 140 and a storage system 150 connected via a network 160. System 100 also includes vehicle 101 and vehicle 101A which may be configured similarly to vehicle 101. Although only a few vehicles and computing devices are depicted for simplicity, a typical system may include significantly more.

As shown in FIG. 2, each of computing devices 110, 120, 130, 140 may include one or more processors, memory, data and instructions. Such processors, memories, data and instructions may be configured similarly to one or more processors 112, memory 114, data 116, and instructions 118 of the one or more server computing devices 110 as discussed further below.

The memory 114 stores information accessible by the one or more processors 112, including instructions 118 and data 116 that may be executed or otherwise used by the processor 112. The memory 114 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 116 may be retrieved, stored or modified by processor 112 in accordance with the instructions 118. The instructions 118 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processor 112 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

The network 160, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and receiving data from other computing devices, such as modems and wireless interfaces.

In one example, the one or more server computing devices 110 may include a plurality of computing devices, e.g., a load balanced server farm, that exchange information with different nodes of a network for the purpose of receiving the data from, processing the data and transmitting the data to other computing devices. For instance, one or more server computing devices 110 may include one or more server computing devices that are capable of communicating with one or more computing devices 310 of vehicle 101 (see FIG. 3) or a similar computing device of vehicle 101A as well as client computing devices 120, 130, 140 via the network 160. For example, vehicles 101 and 101A may be a part of a fleet of vehicles that can be dispatched by server computing devices to various locations. In this regard, the vehicles of the fleet may periodically send the one or more server computing devices location information provided by the vehicle's respective positioning systems and the one or more server computing devices may track the locations of the vehicles.

In addition, server computing devices 110 may use network 160 to transmit and present information to a user, such as user 122, 132, 142 on a display, such as displays 124, 134, 144 of computing devices 120, 130, 140. In this regard, computing devices 120, 130, 140 may be considered client computing devices.

As shown in FIG. 2, each client computing device 120, 130, 140 may be a personal computing device intended for use by a user 122, 132, 142, and have all of the components normally used in connection with a personal computing device including a one or more processors (e.g., a central processing unit (CPU)), memory (e.g., RAM and internal hard drives) storing data and instructions, a display such as displays 124, 134, 144 (e.g., a monitor having a screen, a touch-screen, a projector, a television, or other device that is operable to display information), and user input devices 126, 136, 146 (e.g., a mouse, keyboard, touchscreen or microphone). The client computing devices may also include a camera for recording video streams, speakers, a network interface device, and all of the components used for connecting these elements to one another.

Although the client computing devices 120, 130, and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, a wearable computing device or system, or a netbook that is capable of obtaining information via the Internet or other networks. In another example, client computing device 130 may be a wearable computing system, shown as a head-mounted computing system in FIG. 2. As an example the user may input information using a small keyboard, a keypad, microphone, using visual signals with a camera, or a touch screen.

In some examples, client computing device 140 may be concierge work station used by an administrator to provide concierge services to users such as users 122 and 132. For example, a concierge 142 may use the concierge work station 140 to communicate via a telephone call or audio connection with users through their respective client computing devices or vehicles 101 or 101A in order to ensure the safe operation of vehicles 101 and 101A and the safety of the users as described in further detail below. Although only a single concierge work station 140 is shown in FIGS. 1 and 2, any number of such work stations may be included in a typical system.

Figure 3:
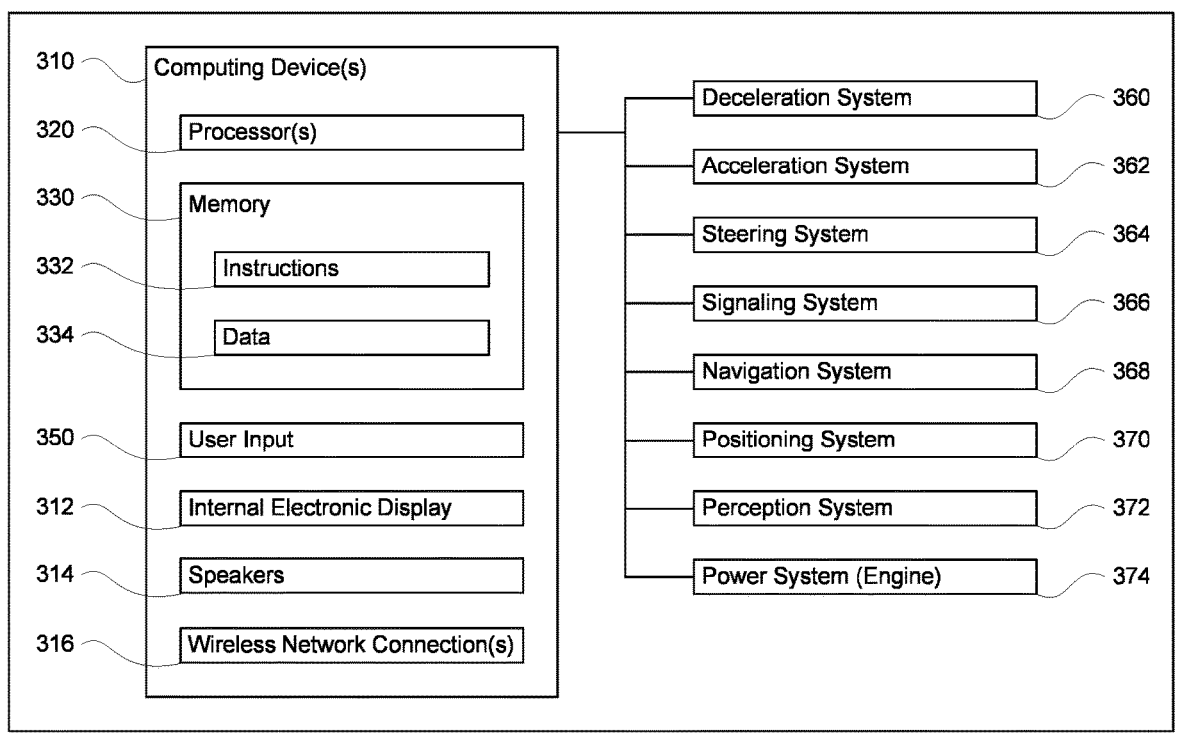
FIG. 3 is an example functional diagram of a control system for a vehicle having an autonomous driving mode in accordance with aspects of the disclosure.

As shown in FIG. 3, a vehicle 101 (or 101A) in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, similar to computing device 310 containing one or more processors 320, memory 330 storing data 334 and instructions 332, and other components typically present in general purpose computing devices as discussed with regard to processors 112 and memory 114 above.

In one example, computing device 310 may be an autonomous driving computing system incorporated into vehicle 101 (or 101A). The autonomous driving computing system may be capable of communicating with various components of the vehicle. For example, returning to FIG. 3, computing device 310 may be in communication with various systems of vehicle 101, such as deceleration system 360 (for controlling braking of the vehicle), acceleration system 362 (for controlling acceleration of the vehicle), steering system 364 (for controlling the orientation of the wheels and direction of the vehicle), signaling system 366 (for controlling turn signals), navigation system 368 (for navigating the vehicle to a location or around objects), positioning system 370 (such as GPS receivers for determining the position of the vehicle), perception system 372 (including various sensors for detecting objects in the vehicle's environment), and power system 374 (for example, a battery and/or gas or diesel powered engine) in order to control the movement, speed, etc. of vehicle 300, in accordance with the instructions of the memory, in an autonomous driving mode which does not require or need continuous or periodic input from a passenger of the vehicle. Again, although these systems are shown as external to computing device 310, in actuality, these systems may also be incorporated into computing device 310, again as an autonomous driving computing system for controlling vehicle 101.

The computing device 310 may control the direction and speed of the vehicle by controlling various components. By way of example, computing device 310 may navigate the vehicle to a destination location completely autonomously using data from the map information and navigation system 368. Computer 310 may use the positioning system 370 to determine the vehicle's location and perception system 372 to detect and respond to objects when needed to reach the location safely. In order to do so, computer 310 may cause the vehicle to accelerate (e.g., by increasing fuel or other energy provided to the engine by acceleration system 362), decelerate (e.g., by decreasing the fuel supplied to the engine, changing gears, and/or by applying brakes by deceleration system 360), change direction (e.g., by turning the front or rear wheels of vehicle 101 by steering system 364), and signal such changes (e.g., by lighting turn signals of signaling system 366). Thus, the acceleration system 362 and deceleration system 360 may be a part of a drivetrain that includes various components between an engine of the vehicle and the wheels of the vehicle. Again, by controlling these systems, computing devices 310 may also control the drivetrain of the vehicle in order to maneuver the vehicle autonomously.

Computing devices 310 may also include various other components for communicating with server computing devices 110 as well as a user or passenger. For instance, computing devices 310 may include various wireless network connections to enable the computing devices to communicate with various computing devices of network 160 including server computing devices 110, for instance. In addition, a user or passenger may input information into the computing devices 310 using user inputs 350, such as a touch screen of an internal electronic display 352, a set of buttons, etc. At the same time, in addition to sending information to a user's client computing device over network 160 via the wireless network connections 356, computing devices 310 may provide information to a user or passenger of the vehicle 101 (or 101A) via an internal electronic display 352 and speakers 354.

Storage system 150 may store various types of information as described in more detail below. This information may be retrieved or otherwise accessed by a server computing device, such as one or more server computing devices 110, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

In addition to information that can be used for identification and authentication purposes, the account information may include other information, such as a history of usage of the service. This "trip history" may include the dates, times, pick up locations, drop off locations, and destinations of previous trips using the service. In some examples, the user account information for a user may include "Favorite" spots or previously identified user-preferred locations that the user has saved to his or her account identifying preferred pickup or drop off locations for that user.

Figure 4:
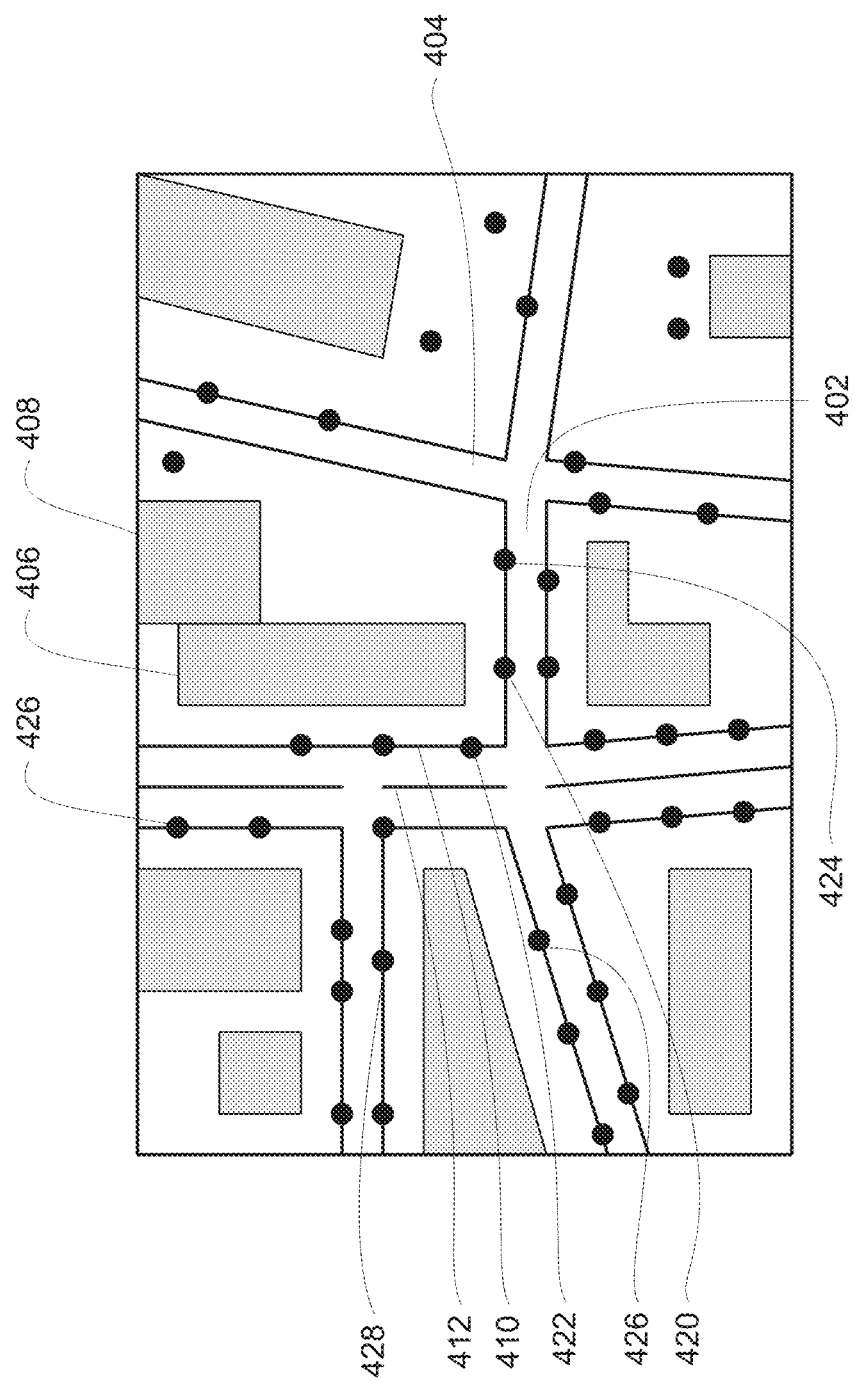
FIG. 4 is an example representation of map information in accordance with aspects of the disclosure.

The storage system 150 may also store detailed map information including information about roads, crosswalks, buildings, elevations, fire hydrants, construction zones, real time traffic conditions, etc. from various sources such as governmental institutions, paid informational services, manually entered information, information gathered and provided in real time by autonomous vehicles, etc. FIG. 4 is an example of map information for a map 400. In this example, map information identifies roads 402, 404, buildings 406, 408, and lane lines 410, 412 (only a few of each of these features being numbered for simplicity).

The detailed map information may also include information identifying predetermined stopping locations where an autonomous vehicle can stop to pick up or drop off a passenger. For instance, map 500 includes predetermined stopping locations 420-424 (only a few of the predetermined stopping locations being numbered for simplicity). These predetermined stopping locations may include predetermined, reasonable locations where a vehicle could stop selected manually or through some analysis of the characteristics of each location. The predetermined stopping locations may also be limited to locations within a service area of the autonomous vehicle service. At least some of the stopping locations may be associated with inconvenience values representing the inconvenience to a passenger if the passenger is picked up when the vehicle is stopped at a stopping location, the inconvenience to a passenger if the passenger is dropped off when the vehicle is stopped at the stopping location, and/or a combination of these.

As with memory 114, storage system 150 can be of any type of computerized storage capable of storing information accessible by the one or more server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to or incorporated into any of the computing devices 110, 120, 130, 140, 310 etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As a vehicle, such as vehicle 101, drives around, the perception system 372 may detect, identify, and log various objects, including pedestrians. Each pedestrian may be provided with an identifier to allow the vehicle to follow the movements of the pedestrian in order to allow the vehicle to, for instance, make predictions about where that pedestrian is likely to go and avoid collisions. When a pedestrian meets a certain set of conditions, the computing devices 310 may log an event for a passenger pickup. As an example, the set of conditions may include that the pedestrian is within a predetermined distance, such as 0.5 meters or more or less, the pedestrian then "disappears" from the vehicle's perception system when the vehicle's door is open, and thereafter the door closes and the pedestrian is still not visible to the perception system. This logged event may include the pedestrian's identifier, a trip identifier, as well as a timestamp for the event. In addition, the computing devices 310 may also log all perception data generated by the perception system 372, such as all observations of other objects as well as the location, orientation, heading, speed, etc. for the vehicle, and provided to the computing devices.

The log, including any events, from vehicle 101 as well as logs from vehicle 101A and other vehicles may be transmitted or otherwise loaded on to the storage system 150 in order to allow the server computing devices 110 to access and process the logs. In this regard, the greater the number of vehicles in the fleet that are or have provided transportation services while logging perception data and events, the greater the number of logs and events within those logs.

The computing devices may the identify logged events corresponding to pickups and process the log data in order to determine an inconvenience value for picking up passengers at the stopping location where the vehicle stopped when the logged event was created. For instance, for a log and a logged event corresponding to a pickup for that log, the computing devices 110 may identify the location of the vehicle from the log using the timestamp for the logged event. This location may correspond to or may be compared to the map information in order to identify the stopping location of the vehicle at the time of the pickup or when the logged event was logged.

The log may be used to retrieve the movements of a passenger from the time when the passenger was first detected by a vehicle's perception system to when the passenger entered the vehicle. For instance, the server computing devices 110 may identify a pedestrian identifier from the logged event. Using the pedestrian identifier, the perception data corresponding to the passenger may be retrieved from the log of that logged event. All perception data for the pedestrian identifier may be retrieved from the log. The sequence in time of these observations may correspond to the passenger's path through the world before reaching the vehicle from a time when the passenger was first observed by the perception system 372.

These observations may be used to determine an observed distance that the passenger traveled. For instance, by summing of the differences between the locations of each observation adjacent in time starting from the first observation in time until the last observation in time before the event was logged, the server computing devices 110 may determine an observed distance that the passenger traveled.

A road edge distance may also be calculated using the observations for the pedestrian. For instance, the server computing devices 110 may determine an edge distance by calculating a difference between the location of the first observation in time and a relevant road edge for the passenger. The road edge may correspond to a curb, grassy edge, sidewalk end, edge of the drivable surface, etc. identified in a map and/or as determined by the perception system 372. The edge distance may be determined using the position of first or earliest in time observation for the pedestrian identifier and determining the distance from that position to the nearest road edge (i.e. a straight line distance).

An inconvenience distance for a pickup may be determined as an additional distance the passenger may have had to travel in order to reach the vehicle. For instance, the server computing devices 110 may determine an inconvenience distance for the stopping location of the pickup location by calculating the difference between the observed distance and the edge distance. This inconvenience distance may therefore represent an additional distance that the passenger was required to walk to reach the stopping location and/or vehicle.

This inconvenience distance for the pickup may be used to determine an inconvenience value for the stopping location for that pickup. For instance, converting an inconvenience distance to an inconvenience value may be a straight 1 to 1 conversion or a conversion to some other scale such as 1 to 0.1, etc. that may involve manual analysis or machine learning. As another instance, the inconvenience value may take into account both walking distance as well as the period of time that it took for the passenger to walk to the vehicle (i.e. the time it took the passenger to walk just the convenience distance or the observed distance). For example, a passenger might have to cross the street which may be a fairly short distance, but if that passenger has to wait 45 seconds for a "walk" signal to cross or a light to turn green the inconvenience value would be greater than if the passenger only had to cross the street without having to wait. The actual value may be on any scale, but as the inconvenience distance increases, the inconvenience value may also increase.

A similar process may be used to determine an inconvenience value for a drop off location. For instance, at the end of a trip, when a passenger exits the vehicle, the passenger may be detected as a pedestrian by the vehicle's perception system. When a pedestrian meets a certain set of conditions, the computing devices 310 may log an event for a passenger drop off. As an example, the set of conditions may include that the pedestrian is within a predetermined distance, such as 0.5 meters or more or less, when the vehicle's door is open and that the pedestrian "appears" from the vehicle's perception system when the vehicle's door is open. In response, the vehicle's computing devices may assign the passenger (now pedestrian) an identifier and log an event. This logged event may include a pedestrian identifier, a trip identifier, as well as a timestamp for the event. As noted above, the log, including any events, from vehicle 101 as well as logs from other vehicles may be transmitted or otherwise loaded on to the storage system 150 in order to allow the server computing devices 110 to access and process the logs.

The computing devices may the identify logged events corresponding to drop offs and process the log data in order to determine an inconvenience value for dropping off passengers at the stopping location where the vehicle stopped when the logged event was created. For instance, for a given log and a logged event corresponding to a drop off of that log, the computing devices 110 may identify the location of the vehicle from the log using the timestamp for the logged event. This location may correspond to or may be compared to the map information in order to identify the stopping location of the vehicle at the time of the drop off or when the logged event was logged.

The log may be used to retrieve the movements of a passenger from the time when the passenger exited the vehicle to when the passenger was last observed by the vehicle's perception system. Again, as noted above, for any given event logged by the computing devices 310, the server computing devices 110 may identify a pedestrian identifier. Using the pedestrian identifier, the perception data corresponding to the passenger may be retrieved from the log generated by the computing devices 310. This may include all of the perception data and observations for the pedestrian identifier may be retrieved from the log. In this case, the sequence in time of these observations may correspond to the passenger's path through the world from a time when the passenger was first observed by the perception system 372 after exiting the vehicle 101.

In addition, using the timestamp for the logged event, the computing devices 110 may be able to retrieve the location of the vehicle from the log at that time. This location may correspond to or may be compared to the map information in order to identify the stopping location of the vehicle at the time of the pickup or when the logged event was logged.

The observations of the passenger may be used to determine an observed distance that the passenger traveled until the passenger was last observed by the vehicle's perception system. For instance, by summing of the differences between the locations of each observation adjacent in time starting from the first observation in time when the event was logged when the passenger exited the vehicle until the last observation in time, the server computing devices 110 may determine an observed distance that the passenger traveled.

A road edge distance may also be calculated using the observations for the pedestrian. For instance, the server computing devices 110 may determine an edge distance by calculating a distance between the passenger's "desired destination" or where the passenger wanted to go after being dropped off to the nearest road edge (i.e. a straight line distance). Because this is not always clear, the desired destination used to determine the road edge distance may be the location of the last or latest in time observation for the pedestrian identifier and/or the the first observation after, the observation during, or the last observation immediately before some maximum predetermined period of time after the timestamp of the logged event, such as 30 seconds or more or less.

An inconvenience distance for a drop off at the stopping location may be determined as an additional distance the passenger may have had to travel in order to reach the passenger's desired destination. For instance, the server computing devices 110 may determine an inconvenience distance for the stopping location of the drop off location by calculating the difference between the observed distance and the edge distance. This inconvenience distance may therefore represent an additional distance that the passenger was required to walk to reach the passenger's desired destination from the stopping location and/or vehicle. This inconvenience distance may be used to determine an inconvenience value for the stopping location for that drop off location as discussed above with regard to the inconvenience value for a stopping location for a pick up location.

Figure 5:
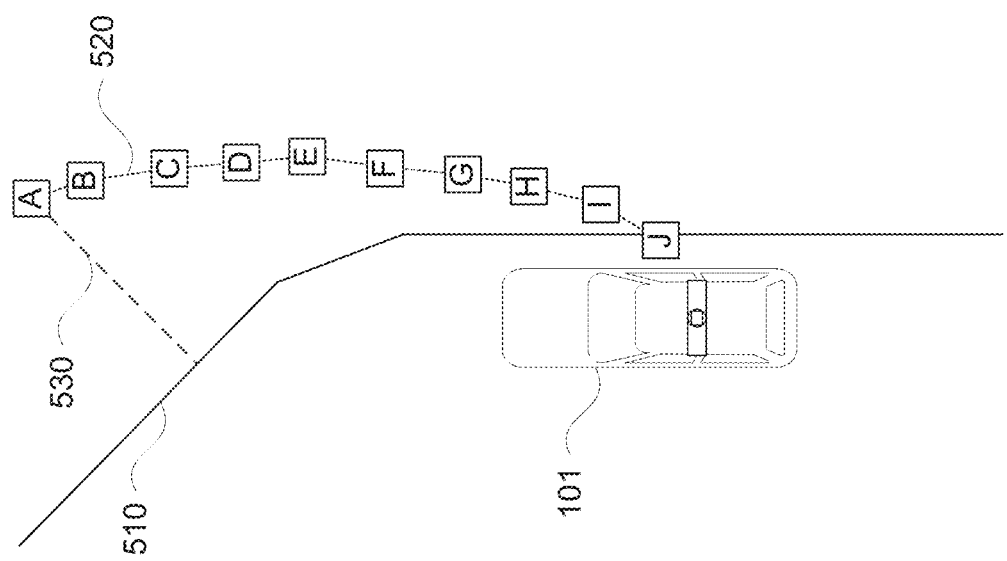
FIGS. 5-11 are various example diagrams of vehicles stopped at stopping locations in accordance with aspects of the disclosure.

FIG. 5 represents an example 500 of vehicle 101 stopped at a stopping location of the map information. Adjacent to the vehicle is the road edge 510. Rectangles A-J represent observations of a passenger such that dashed line 520 represents a path of the passenger though the world and the length of dashed line 520 represents an observed distance for the passenger. If example 500 refers to a pickup of a passenger, rectangle A represents an earliest in time observation of the pedestrian, and observation J represents a last in time observation before the passenger "disappears" into the vehicle 101. If example 500 refers to a drop off of a passenger, rectangle J represents an earliest in time observation just after the pedestrian has exited the vehicle, and rectangle A represents the last or latest in time observation for the pedestrian identifier and/or the latest in time observation, the first observation after, the observation during, or the last observation immediately before some maximum predetermined period of time after the timestamp of the logged event. In either example, the edge distance is shortest distance between the location of the observation of rectangle A to the road edge 510, or the distance represented by dashed line 530. The difference between the distance of dashed line 520 and the dashed line 530 is the inconvenience distance (for the pickup or the drop off) at the stopping location of example 500.

Figure 6:
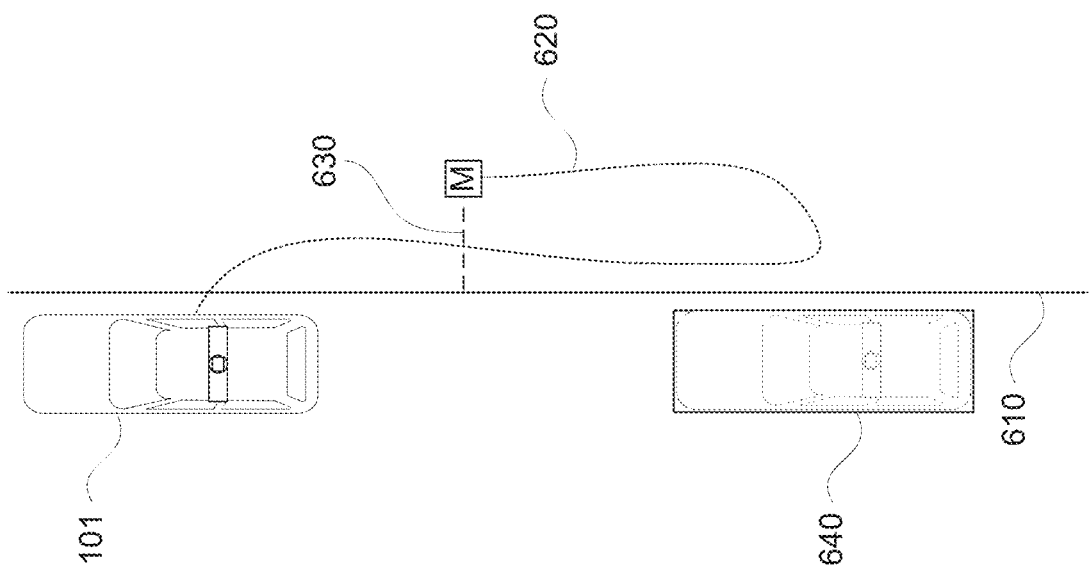

FIG. 6 represents an example 600 of vehicle 101 stopped at a stopping location of the map information to pick up a passenger after approaching the stopping location very slowly from the location of box 640. Adjacent to the vehicle is the road edge 610. Rectangle M represents an earliest in time observation of the passenger and dashed line 620 represents a path of the passenger though the world from the location of rectangle M to the vehicle 101. The length of dashed line 620 represents an observed distance for the passenger. The edge distance is shortest distance between the location of the observation of rectangle M to the road edge 610, or the distance represented by dashed line 630. The difference between the distance of dashed line 620 and the dashed line 630 is the inconvenience distance for the pickup at the stopping location of example 600. The path of dashed line 620 represents the path of the passenger taken in reaction to seeing the vehicle slow down at the location of box 640, but continuing until the stopping location of example 600. For instance, the passenger may have tried to meet the vehicle at the location of box 640 only to have the vehicle 101 continue passed the passenger to the stopping location of example 600. Thus, in this example, the inconvenience distance and inconvenience value would be relatively high.

Figure 7:
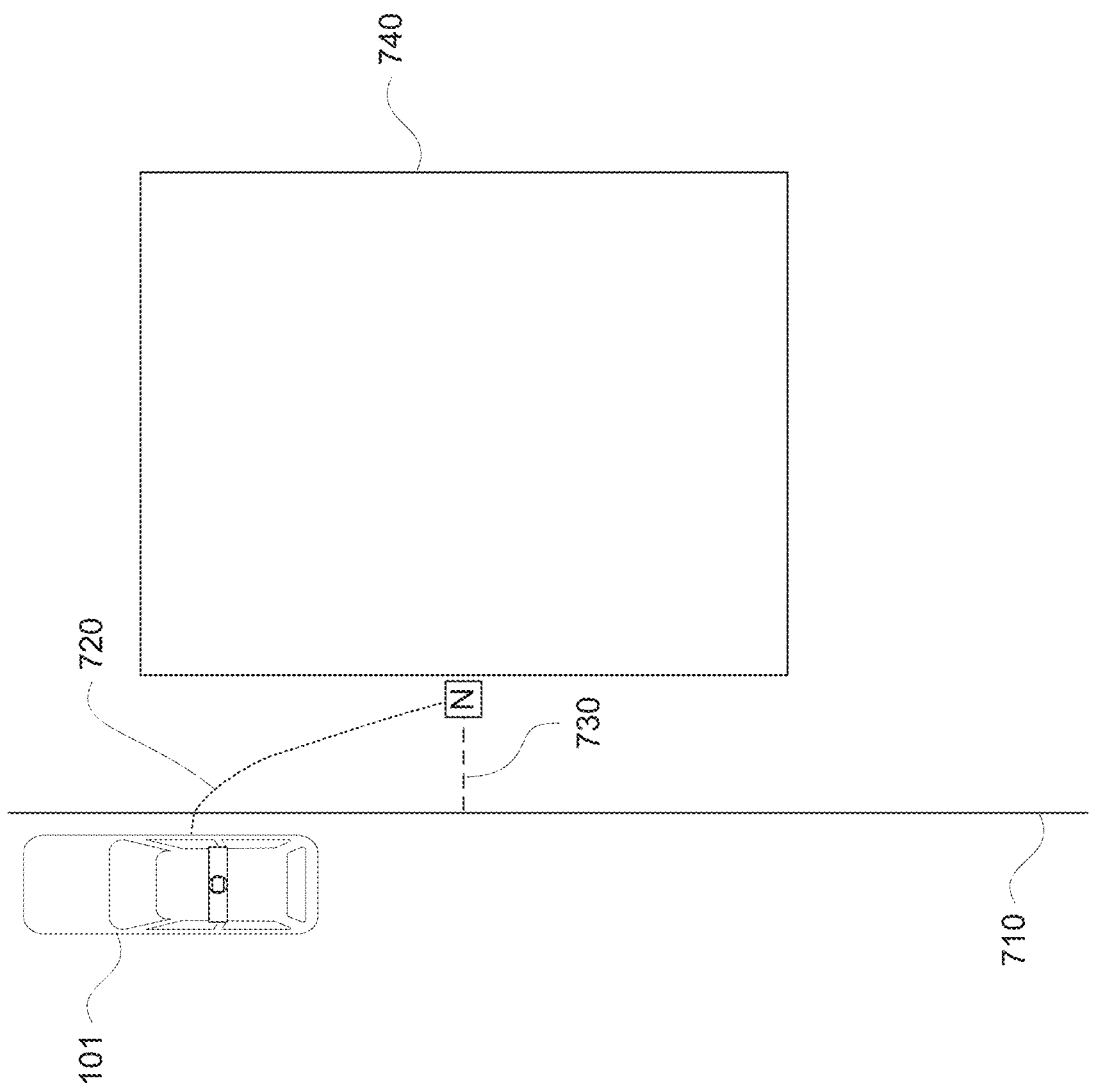

FIG. 7 represents an example 700 of vehicle 101 stopped at a stopping location of the map information to pick up a passenger who comes out of an exit of a building 740. Adjacent to the vehicle is the road edge 710. Rectangle N represents an earliest in time observation of the passenger and dashed line 720 represents a path of the passenger though the world from the location of rectangle N to the vehicle 101. The length of dashed line 720 represents an observed distance for the passenger. The edge distance is shortest distance between the location of the observation of rectangle N to the road edge 710, or the distance represented by dashed line 730. The difference between the distance of dashed line 720 and the dashed line 730 is the inconvenience distance for the pickup at the stopping location of example 700. Thus, in this example, the inconvenience distance is dependent upon how close the vehicle 101 is to the exit of the building 740 such that the farther the vehicle is from the entrance, the greater the inconvenience distance is and the closer the vehicle is to the entrance, the smaller the inconvenience distance is.

Figure 8:
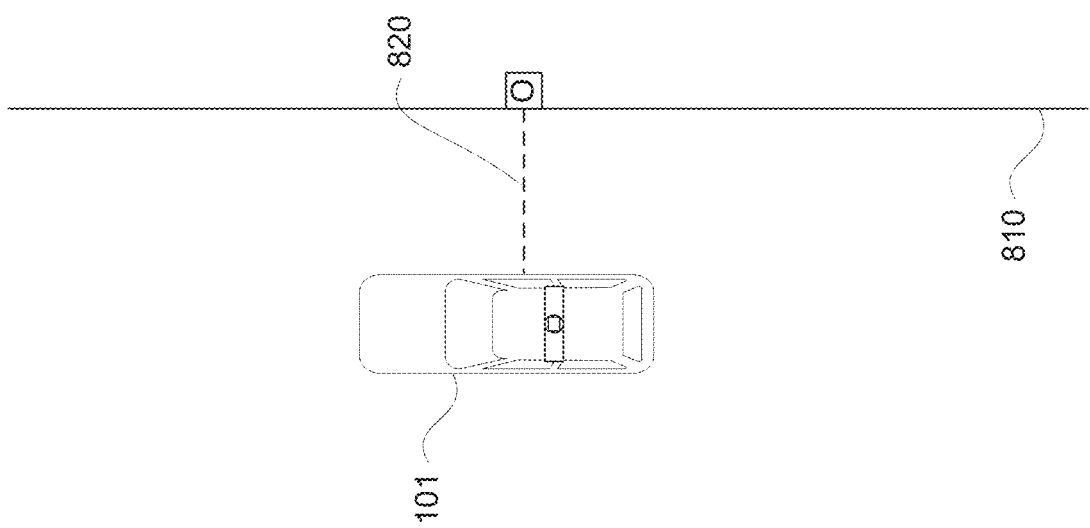

FIG. 8 represents an example 800 of vehicle 101 stopped at a stopping location of the map information to pick up a passenger who is waiting at or nearly at a road edge 810. Rectangle O represents an earliest in time observation of the passenger and dashed line 820 represents a path of the passenger though the world from the location of rectangle O to the vehicle 101. The length of dashed line 820 represents an observed distance for the passenger. The edge distance is shortest distance between the location of the observation of rectangle O to the road edge 810, or here zero or nearly zero. Here, the inconvenience distance for the pickup at the stopping location of example 800 is the distance represented by the length of the dashed line 820. Thus, in this example, the inconvenience distance is dependent upon how close the vehicle 101 is to the road edge 810 such that the farther the vehicle is from the road edge, the greater the inconvenience distance is and the closer the vehicle is to the road edge, the smaller the inconvenience distance is.

Figure 9:
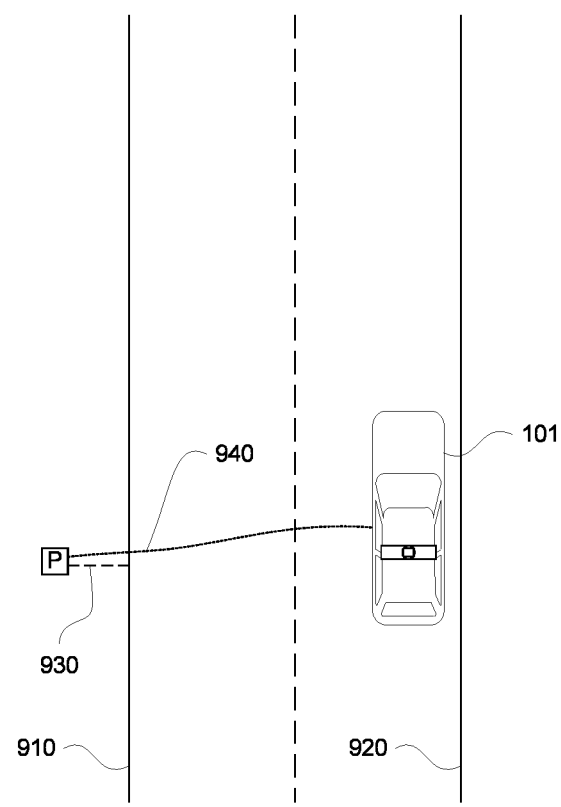

FIG. 9 represents an example 900 of vehicle 101 stopped at a stopping location of the map information to pick up a passenger who is waiting at or nearly at the road edge 910. Adjacent to the vehicle is the road edge 920. Rectangle P represents an earliest in time observation of the passenger and dashed line 940 represents a path of the passenger though the world from the location of rectangle P to the vehicle 101. The length of dashed line 920 represents an observed distance for the passenger. The edge distance is shortest distance between the location of the observation of rectangle P and the closet road edge, which here is road edge 910, or the distance represented by dashed line 930. The difference between the distance of dashed line 920 and the dashed line 930 is the inconvenience distance for the pickup at the stopping location of example 900. Thus, in this example, the inconvenience distance is dependent upon how close the vehicle 101 is to the road edge closet to the passenger, and not necessarily the road edge closest to the vehicle. In other words, the inconvenience distance takes into account the fact that the passenger has to cross the road to reach the vehicle.

Figure 10:
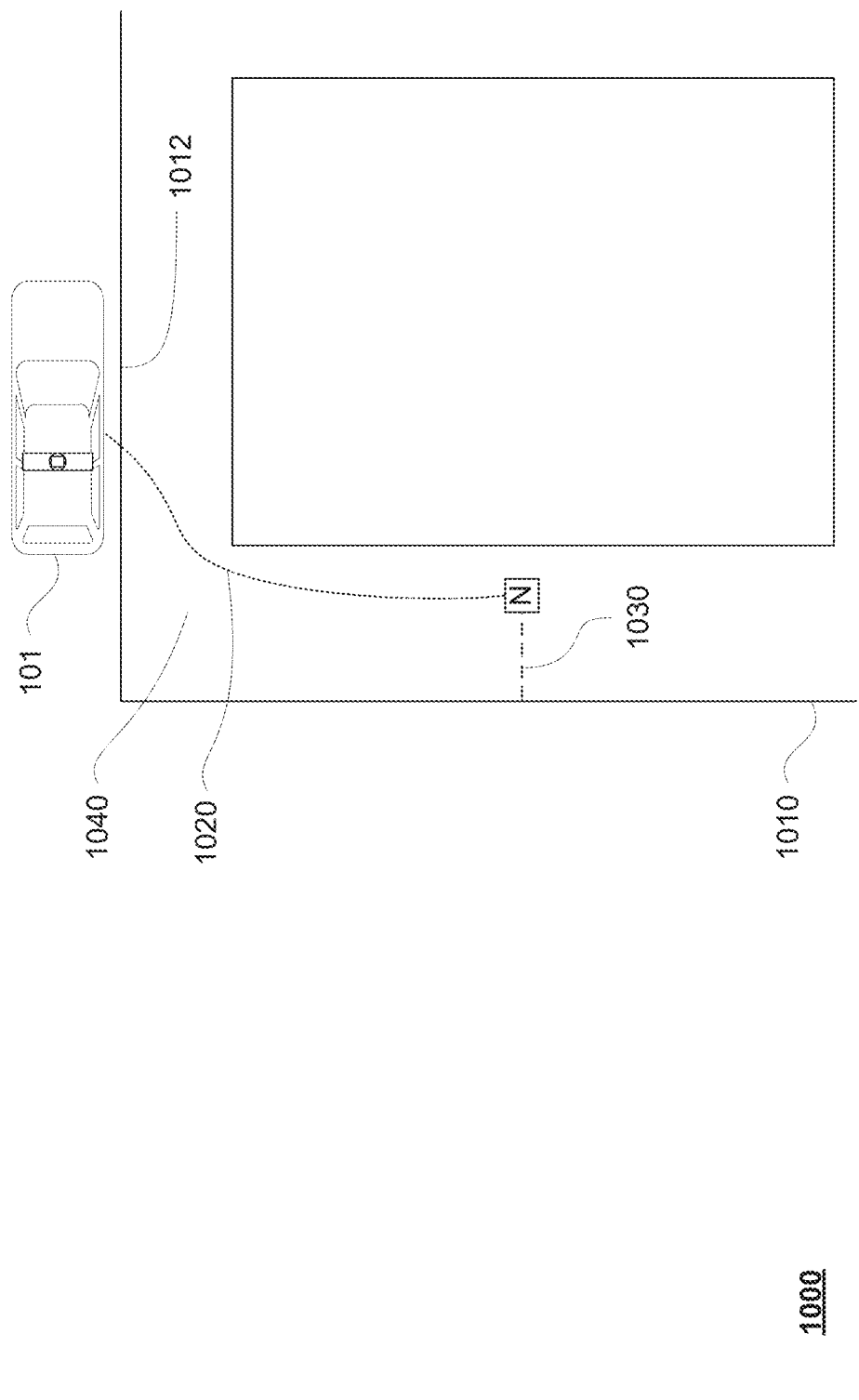

FIG. 10 represents an example 1000 of vehicle 101 stopped at a stopping location of the map information to pick up a passenger who is waiting at or nearly at the road edge 1010 which is around a corner 1040 from the road edge 1012 where the vehicle is stopped. Rectangle N represents an earliest in time observation of the passenger and dashed line 1020 represents a path of the passenger though the world from the location of rectangle N to the vehicle 101. The length of dashed line 1020 represents an observed distance for the passenger. The edge distance is shortest distance between the location of the observation of rectangle N and the closet road edge, which here is road edge 1010. The difference between the distance of dashed line 1020 and the dashed line 1030 is the inconvenience distance for the pickup at the stopping location of example 1000. Again, in this example, the inconvenience distance is dependent upon how close the vehicle 101 is to the road edge closet to the passenger, and not necessarily the road edge closest to the vehicle. In other words, the inconvenience distance takes into account the fact that the passenger has to walk around the corner to reach the vehicle.

In some instances, such as in crowds, around large vegetation, or where there are other occlusions, sometimes a particular passenger (or pedestrian identifier) may disappear for the vehicle's perception system and when that pedestrian reappears, it may be assigned a different pedestrian identifier. To address this and identify all of the observations for a passenger, GPS or other location information reported by a client computing device to the computing devices of the vehicle and/or the server computing devices over time for some period of time before a pickup or after a drop off may be used to "merge together" different pedestrian identifiers that may actually correspond to the same person. Without correction, this may cause the inconvenience distance and accordingly, the inconvenience value for a given stopping location to be lower than it actually should be, as otherwise, the location of first observation of a passenger (for a pickup) or location of the last observation of a passenger (for a drop off) may actually be incorrect.

Figure 11:
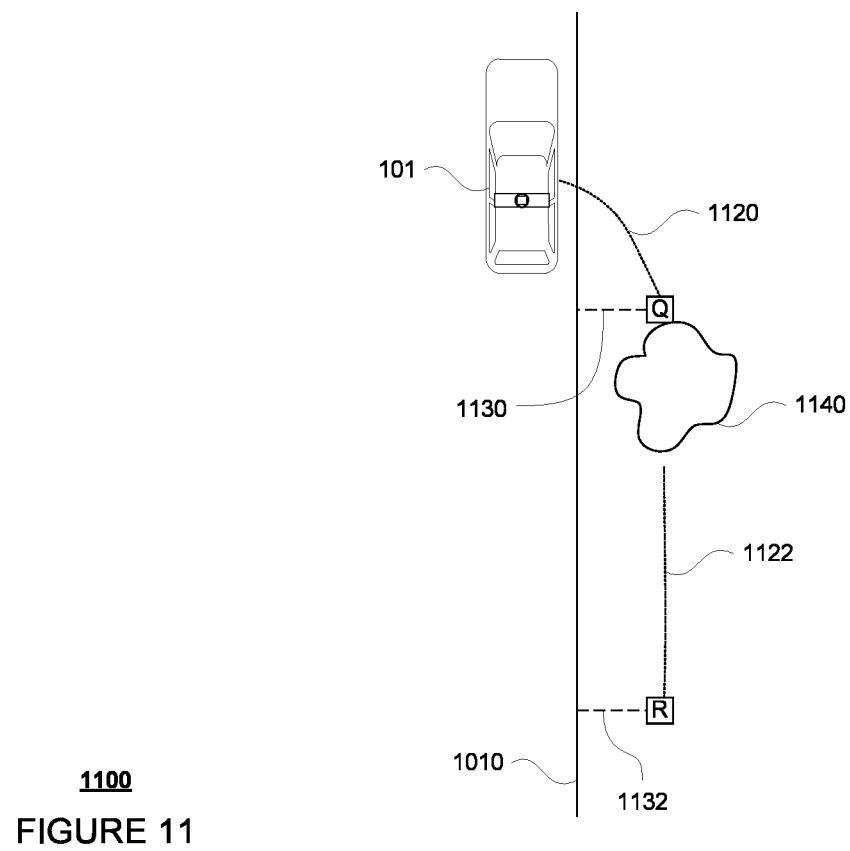

FIG. 11 represents an example 1100 of vehicle 101 stopped at a stopping location of the map information to pick up a passenger. Rectangle R represents an earliest in time observation of a pedestrian and dashed line 1122 represents a path of the pedestrian though the world from the location of rectangle R to a location next to a vegetation 1140. In this example, once the pedestrian is next to the vegetation, the pedestrian "disappears" from the view of the perception system 372. In other words, the vegetation 1140 obstructs the perception system 372's view of the pedestrian. Thus, the length of dashed line 1120 represents an observed distance for the pedestrian. The edge distance for the passenger is shortest distance between the location of the observation of rectangle Q and the road edge 1010 or the distance represented by dashed line 1130. Accordingly, the difference between the distance of dashed line 1120 and the dashed line 1130 would be the inconvenience distance for the pickup at the stopping location.

Rectangle R represents an earliest in time observation of a pedestrian and dashed line 1120 represents a path of the passenger though the world from the location of rectangle R next to the vegetation 1140 to the vehicle 101. The length of dashed line 1122 represents an observed distance for the pedestrian. In this example, the passenger "appears" next to the vegetation, and although the passenger and the pedestrian may actually be the same person, the computing devices 310 may assign observations of the passenger and the pedestrian different pedestrian identifiers. Thus, when assessing the inconvenience values, if the computing devices 110 were only to consider the observations of the passenger, the resulting inconvenience value may be inaccurate.

In order to "merge" the observations for the different pedestrian identifiers together and to use a more accurate observed distance and road edge distance, as noted above, GPS or other location information reported by a client computing device of the passenger as well as other information may be used. For instance, walking directions from the vehicle to a destination when a passenger is dropped off may be provided to the passenger's client computing device by the computing devices 110 and/or 310 as well as behavior predictions for the passenger generated by the computing devices 110 and/or 310 based on the observations of the passenger's pedestrian identifier may be used to identify other pedestrian identifiers proximate in time and space to the observations of the passenger's pedestrian. In this regard, observations for a pedestrian identifier which exhibits movements consistent with the location information reported by the passenger's client computing device, walking directions, and/or the behavior predictions may be merged with the observations of the passenger's pedestrian identifier.

Once merged, the observed distance is the sum of the distances between all of the observations in time sequence for the both of the different pedestrian identifiers or the total distance represented by dashed lines 1120 and 1122 plus the shortest distance between the location where the pedestrian disappeared and the location of rectangle Q, and the edge distance would be measured from the location of the observation of rectangle R or the distance represented by dashed line 1132. The difference between the observed distance and the dashed line 1132 is the inconvenience distance for the pickup at the stopping location of example 1000.

The inconvenience values for pickups and drop offs at different stopping locations may be aggregated over a plurality of different vehicles and trips and used to generate map data. As an example, the inconvenience values for a given stopping location for all passengers, subsets of passengers, or a particular passenger may be aggregated, and in some instances averaged or otherwise normalized. For instance, an inconvenience value for a given stopping location could be determined using an average or weighted average (for instance, weighted by the road edge and/or observed distances) of the inconvenience distances for the given stopping location and/or nearby stopping locations. In some instances, that average inconvenience value could be converted to a 0 to 1 or other scale. Similarly, an inconvenience value for a given stopping location could be determined by averaging all of the inconvenience values for the given stopping locations.

These aggregated values may be used to generate map data. This map data may be a map or information used to supplement a map. For instance, the inconvenience values may be plotted on a road map or road graph thereby identifying the locations having the greatest inconvenience for pickup locations or drop off locations. In some instances, separate map data or maps may be generated for pickup and drop off inconvenience values for the same or different stopping locations, or alternatively, these values may be combined into a single inconvenience value for each stopping location.

This map data and map may be used in various ways. For instance, a user or passenger may download an application for requesting a vehicle to a client computing device. For example, users 122 and 132 may download the application via a link in an email, directly from a website, or an application store to client computing devices 120 and 130. For example, client computing device may transmit a request for the application over the network, for example, to one or more server computing devices 110, and in response, receive the application. The application may be installed locally at the client computing device.

The user may then use his or her client computing device to access the application and request a vehicle. As an example, a user such as user 132 may use client computing device 130 to send a request to one or more server computing devices 110 for a vehicle. As part of this, the user may identify a pickup location, a destination location, and a drop off location. In this regard, the drop off location may be a physically different location from a destination location.

An initial location for a pick up or drop off may be sent by a client computing device of a user or passenger to one or more server computing devices via the network. A user or passenger may specify this initial location in various ways. As an example, a pickup location can be defaulted to current location of the passenger's client computing device, but may also be a recent or saved location near the current location associated with the passenger's account. The passenger may enter an address or other location information, tap a location on a map or select a location from a list in order to identify a pickup and/or destination location. For instance, for a pickup location, the client computing device 120 may send its current location, such as a GPS location, to the one or more server computing devices 110.

Figure 12:
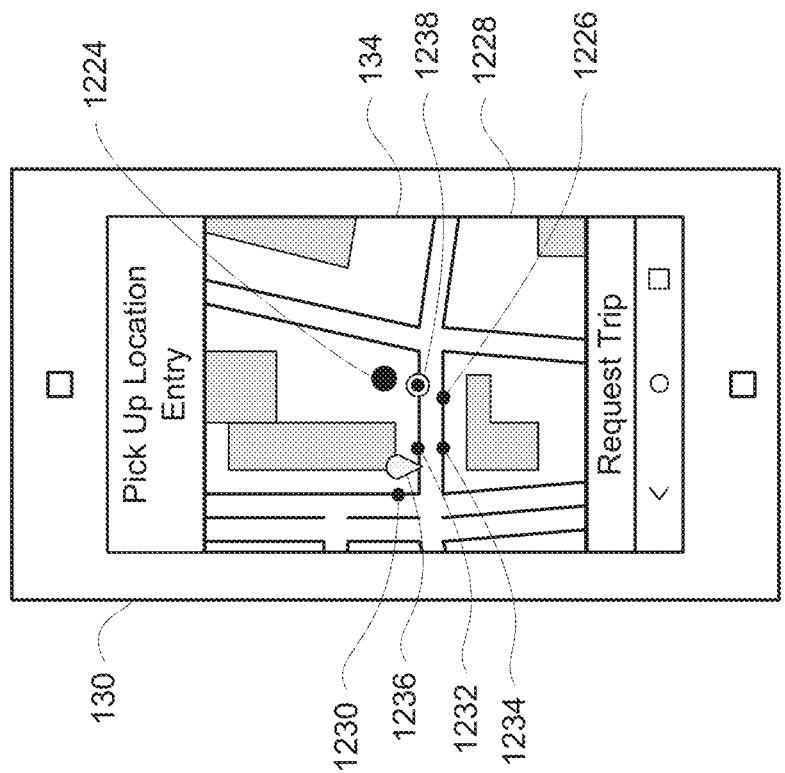
FIG. 12 is an example client computing device and screen shot in accordance with aspects of the disclosure.

In response to receiving an initial location, the one or more server computing devices may provide a map to the client computing devices for display. For instance, the one or more server computing devices 110 may use the initial location to identify a relevant map area from the map information of storage system 150 and send this map to the client computing device 130 for display as shown in FIG. 12. In this example, marker 1224 represents an estimated location of the client computing device 130. Thus, this example may correspond to specifying a pick up location, though the same or similar process may be used for a specifying a drop off location. The marker 1236 represents the initial location as displayed on map 1228.

In addition, the server computing devices may provide one or more suggested stopping locations within the relevant map area as well as any corresponding pickup, drop off, and/or combined pickup and drop off inconvenience values for those suggested stopping locations to the client computing devices. As an example, the suggested stopping locations may include all stopping locations within the relevant map area or the closest 5 or 10 or more or less stopping locations to the initial location. For example, circles 1230, 1232, 1234, 1226, 1238 represent the 5 stopping location of the map information 400 that are closest to the initial location.

These suggested stopping locations may displayed at the client computing device in order to allow the passenger to select an actual stopping location. As an example, if the passenger is specifying a pickup location, the stopping locations having no pickup or combined inconvenience value, a pickup or combined inconvenience value lower than a threshold, or the 5 or 10 or more or less stopping locations having the lowest pickup or combined inconvenience values may be flagged or otherwise highlighted as being the most convenient locations for a particular area. Similarly, if the passenger is specifying a drop off location, the stopping location or locations having no drop off or combined inconvenience value or a lowest drop off or combined inconvenience value, a drop off or combined inconvenience value lower than a threshold, or the 5 or 10 or more or less stopping locations having the lowest drop off inconvenience values may be flagged or otherwise highlighted as being convenient locations for a particular geographic area. For instance, circle 1238 is depicted differently to circles 1230, 1232, 1234, 1236 to indicate that circle 1238 has a low inconvenience value or is likely to be the most convenient pickup location for the passenger. In addition or alternatively, the passenger may be provided with an option to view all possible pickup locations in an area, and certain of those may be flagged as being the most convenient or least inconvenient.

Alternatively, the server computing devices may identify and provide a subset of those stopping locations having no or the lowest inconvenience values. As an example, if the passenger is specifying a pickup location, the stopping locations having no pickup or combined inconvenience value, a pickup or combined inconvenience value lower than a threshold, or the 5 or 10 or more or less stopping locations having the lowest pickup or combined inconvenience values may be included in the subset. Similarly, if the passenger is specifying a drop off location, the stopping locations having no drop off or combined inconvenience value, a drop off or combined inconvenience value lower than a threshold, or the 5 or 10 or more or less stopping locations having the lowest drop off or combined inconvenience values may be included in the subset.

In other instances, the map data, inconvenience values, and/or maps including these inconvenience values may be sent to the computing devices of one or more autonomous vehicles and used to identify pickup and/or drop off locations. For instance, the server computing devices 110 may send this information to the computing devices 310 via network 160. In some instances, the computing devices 110 may incorporate the inconvenience values into and/or used to augment the map information used by the computing devices to control the vehicle 101.

While a passenger may have designated a particular stopping location as a pickup or drop off location as in the example above, sometimes this particular location may be occupied by another vehicle or otherwise obstructed. The computing devices 110 may then refer to the map in order to identify a next or closest available stopping location having a lowest inconvenience value and proceed to that stopping location in order to pick up or drop off a passenger. For instance, if the vehicle is picking up a passenger, the computing devices may search the stopping locations in the map information to find a closest available (i.e. not occupied or obstructed) stopping location with a pickup (or combined pickup and drop off) inconvenience value that is not too high. This may also include choosing a stopping location with a lesser inconvenience to the vehicle as this would likely mean a safer ingress and/or egress for the passenger. In such situations, the passenger's client device may be provided with (via the vehicle and/or the server computing devices) and display an notification to inform the passenger why the vehicle is making what seems to be a less convenient choice for the passenger. This may make them feel more comfortable and satisfied with the change.

In some instances, when assessing an inconvenience value, the server computing devices 110 may use the logs to determine how long a vehicle had to wait after being stopped at a stopping location for a passenger to enter the vehicle and close the door (in the case of a pickup) or how long the vehicle had to wait after being stopped at a stopping location for a passenger to exit the vehicle and close the door (in the case of a drop off). In such cases, these wait times may be normalized as for pickups, the vehicle is more likely to wait longer and as for drop offs, a passenger typically occurs much faster. Of course, if there is a large number of events included, these differences may average out. This additional information may help to better optimize the selection of the most convenient or least inconvenient stopping locations for picking up and dropping off passengers.

As more logged events are processed by the server computing devices 110 as discussed above, additional information may be gleaned. For instance, further analysis may identify the characteristics of why some stopping locations are better than others, such as because they are near staircases, building entrances, accessibility ramps, etc. From this information, the server computing devices may be able to assess inconvenience values of other stopping locations which have no or very few logged events by identifying similarities between characteristics of the other stopping locations and characteristics of stopping locations with associated inconvenience values. This may be performed manually, automatically (for instance, using machine learning), or otherwise. For instance, at least initially, certain nearby features and/or stopping locations may be manually or automatically tagged (for instance, using machine learning) if they indicate very high, very low, trending upwards, and/or trending downwards inconvenience values. This tagging as well as information identifying and/or about the features themselves (which may also have been manually or automatically generated) may be used to train a model to automatically identify and/or estimate inconvenience values for stopping locations.

Figure 13:
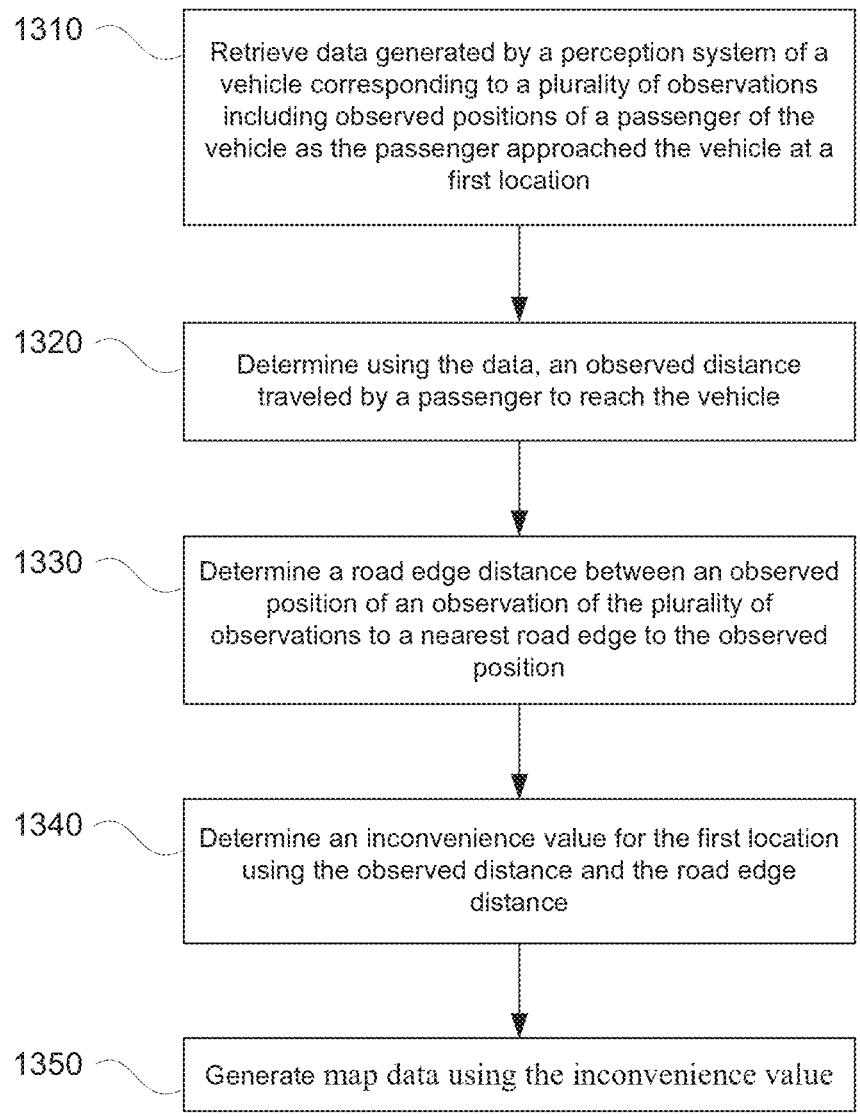
FIG. 13 is an example flow diagram in accordance with aspects of the disclosure.

FIG. 13 is an example flow diagram 1300 in accordance with some of the aspects described above that may be performed by one or more computing devices such as the one or more server computing devices 110. At block 1310 data generated by a perception system of a vehicle is retrieved. The data corresponds to a plurality of observations including observed positions of a passenger of the vehicle as the passenger approached the vehicle at a first location. At block 1320, an observed distance traveled by a passenger to reach the vehicle is determined using the plurality of observations. At block 1330, a road edge distance between an observed position of an observation of the plurality of observations to a nearest road edge to the observed position is determined. At block 1340, an inconvenience value for the first location is determined using the observed distance and the road edge distance. At block 1350, map data is generated using the inconvenience value.

Figure 14:
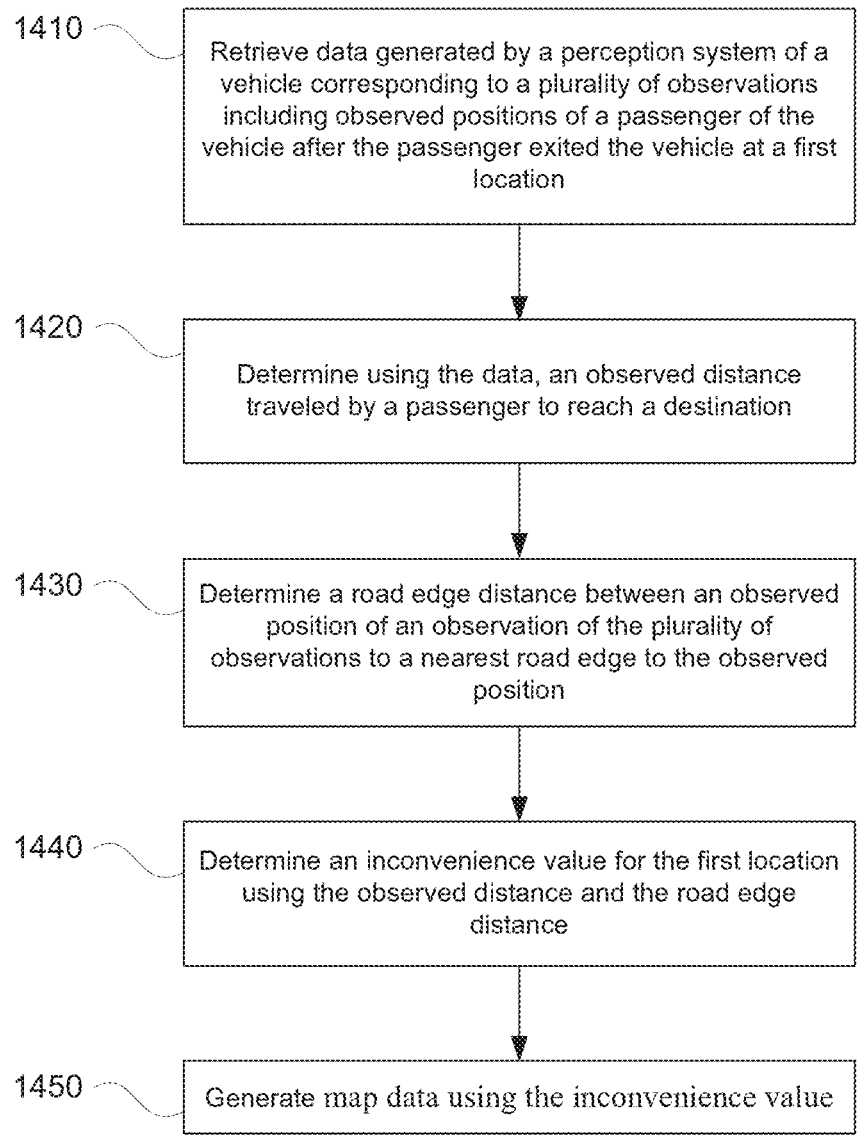
FIG. 14 is an example flow diagram in accordance with aspects of the disclosure.

FIG. 14 is an example flow diagram 1400 in accordance with some of the aspects described above that may be performed by one or more computing devices such as the one or more server computing devices 110. At block 1410 data generated by a perception system of a vehicle is retrieved. The data includes a plurality of observations including observed positions of a passenger of the vehicle after the passenger exited the vehicle at a first location. At block 1420, an observed distance traveled by a passenger to reach a destination is determined. At block 1430, a road edge distance between an observed position of an observation of the plurality of observations corresponding to a nearest road edge to the observed position is determined. At block 1440, an inconvenience value for the first location is determined using the observed distance and the second road edge distance. At block 1450, map data is generated using the second inconvenience value.

Although the examples herein relate to assessing inconvenience and determining inconvenience values from inconvenience distances, these inconvenience distances may be used to determine a convenience value. As an example, a convenience score for a given stopping location may be inversely related to the inconvenience score for the given location. Inconvenience scores may also be normalized relative to local minima This would mean that the most convenient stopping locations may be directly in front of an entrance and/or exit because that is the local minima of inconvenience. These convenience values could be used to generate a map and/or map data which can users or passengers in identifying pickup and/or drop off locations as well as assist the computing devices of autonomous vehicles in identifying where to stop in order to pick up or drop off a passenger in the same or similar to the ways discussed above with regard to inconvenience values. Of course, a stopping location with a higher convenience value would be preferable to a stopping location with a lower convenience value. Similarly, a stopping location with a high convenience value should have a low inconvenience value, and a stopping location with a low convenience value should have a high inconvenience value.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of generating map data, the method comprising;
retrieving, by one or more processors, data generated by a perception system of a vehicle corresponding to a plurality of observations including observed positions of a passenger of the vehicle as the passenger approached the vehicle at a first location, the data including road edge information;
determining, by the one or more processors, using the data, an observed distance traveled by the passenger to reach the vehicle;
determining, by the one or more processors, a road edge distance between an observed position of an observation of the plurality of observations and a portion of a road edge nearest to the observed position in accordance with the road edge information;
determining, by the one or more processors, an inconvenience value for the first location using the observed distance and the road edge distance;
generating, by the one or more processors, the map data using the inconvenience value; and
providing, by the one or more processors, the map data to one or more computing devices of the vehicle, whereby the one or more computing devices are able to use the map data to control the vehicle.

2. The method of claim 1, wherein the inconvenience value is determined further based on a difference between the observed distance and the road edge distance.

3. The method of claim 1, further comprising incorporating the map data into a prior map.

4. The method of claim 3, further comprising determining the road edge nearest to the observed position using the prior map.

5. The method of claim 1, wherein the observed position is an earliest in time observation of all of the observed positions of the passenger.

6. The method of claim 1, wherein the observed position has a timestamp corresponding to a time that is a predetermined period of time before a time when the passenger reached the vehicle.

7. The method of claim 1, further comprising:
receiving, from a client computing device, a request to identify one or more possible pickup locations for a trip; and
in response to the request to the client computing device, providing information identifying the first location using the inconvenience value.

8. The method of claim 7, further comprising, providing, in response to the request to the client computing device, a notification identifying convenience or inconvenience of the first location based on the inconvenience value.

9. The method of claim 1, wherein the observed distance corresponds to a sum of differences in distances between adjacent observed positions of the plurality of observations, and wherein adjacent corresponds to adjacent in time.

10. The method of claim 1, wherein the data further includes a second plurality of observations including second observed positions of the passenger of the vehicle after the passenger exits the vehicle at a second location, and the method further comprises:
determining, using the data, a second observed distance traveled by the passenger to reach a destination;
determining a second road edge distance between a second observed position of a second observation of the second plurality of observations and a portion of a second road edge nearest to the second observed position; and
determining a second inconvenience value for the second location using the second observed distance and the second road edge distance, wherein the second inconvenience value is used to generate the map data.

11. The method of claim 10, wherein the second inconvenience value is determined further based on a difference between the second observed distance and the second road edge distance.

12. The method of claim 10, further comprising incorporating the map data into a prior map.

13. The method of claim 12, further comprising determining the second road edge nearest to the observed position using the prior map.

14. The method of claim 10, wherein the second observed position is a latest in time observation of the second observed positions of the passenger.

15. The method of claim 10, wherein the second observed position has a timestamp corresponding to a time that is a predetermined period of time after a time when the passenger left the vehicle.

16. The method of claim 10, further comprising providing the second inconvenience value to the computing device of the autonomous vehicle.

17. The method of claim 10, further comprising:
receiving, from a client computing device, a request to identify one or more possible drop off locations for a trip; and
in response to the request to the client computing device, providing information identifying the second location using the second inconvenience value.

18. The method of claim 17, further comprising, providing, in response to the request to the client computing device, a notification identifying convenience or inconvenience of the second location based on the second inconvenience value.

19. The method of claim 10, wherein the second observed distance corresponds to a sum of differences in distances between adjacent second observed positions of the second plurality of observations, and wherein adjacent corresponds to adjacent in time.

20. The method of claim 10, further comprising:
identifying, using the data, the second road edge; and
determining the portion of the second road edge nearest to the second observed position.

21. The method of claim 1, further comprising:
identifying, by the one or more processors, using the data, the road edge; and
determining, by the one or more processor, the portion of the road edge nearest to the observed position.

* * * * *

UNITED STATES PATENT AND TRADEMARK OFFICE
CERTIFICATE OF CORRECTION

PATENT NO. : 11,022,452 B2  Page 1 of 1
APPLICATION NO. : 15/985144
DATED : June 1, 2021
INVENTOR(S) : John Wesley Dyer It is certified that error appears in the above-identified patent and that said Letters Patent is hereby corrected as shown below:

In the Claims

Claim 16, Column 20, Line 15:
Now reads: "the autonomous vehicle"; should read -- the vehicle --

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*